United States Patent

[11] 3,622,073

[72] Inventor Alexandre J. Cayre
 Codalming, England
[21] Appl. No. 876,249
[22] Filed Nov. 13, 1969
[45] Patented Nov. 23, 1971
[73] Assignee RFD - GQ Limited
[32] Priority Nov. 18, 1968
[33] Great Britain
[31] 54,673/68

[54] MEANS FOR MOVING HEAVY LOADS
 4 Claims, 3 Drawing Figs.
[52] U.S. Cl..................................... 238/10 R,
 14/28, 180/125, 254/2, 280/DIG. 7
[51] Int. Cl........................................ E01b 23/10
[50] Field of Search.......................... 254/2;
 238/10, 13, 10 R; 180/125; 152/333; 14/27, 28,
 29; 280/DIG. 7

[56] References Cited
 UNITED STATES PATENTS
2,423,832 7/1947 Gearon........................ 14/27

| | | | |
|---|---|---|---|
| 3,023,826 | 3/1962 | Larson | 280/DIG. 7 |
| 722,256 | 3/1903 | Sheeler | 238/13 |
| 1,966,428 | 7/1934 | Brown | 152/333 |
| 3,104,496 | 9/1963 | Macks | 180/125 |
| 3,191,706 | 6/1965 | Petersen | 180/125 |
| 3,211,425 | 10/1965 | Grevlich et al. | 254/2 (2) |
| 3,411,637 | 11/1968 | Lely | 238/13 |
| 3,513,934 | 5/1970 | Crowley | 180/125 |

Primary Examiner—Drayton E. Hoffman
Assistant Examiner—Richard A. Bertsch
Attorney—Watson, Cole, Grindle & Watson ABSTRACT: Means for moving a heavy load comprising an inflatable support to be placed under an accessible part of the LOAD, a plurality of inflatable track elements to be arranged in abutting end to end relationship to provide an extended length of track over which the support can be dragged to move the load and anchoring means for securing the track element to the ground, the support and the track elements being of a flexible material and capable of expansion from an inoperative deflated condition to an operative extended condition by the admission of pressure fluid thereto.

PATENTED NOV 23 1971    3,622,073

Inventor
by Alexandre J. Coyne
Watson, Cole, Grindle & Watson

MEANS FOR MOVING HEAVY LOADS

This invention provides means for moving a heavy load, comprising a support to be placed under an accessible part of the load and a track over which the support can be dragged to move the load, the support or the track (and preferably both these components) being inflatable so that inflation thereof raises the load from the ground or other supporting surface prior to movement of the load on the support along the track.

This invention relates to means for moving heavy loads, particularly loads such as crashed aircraft for example.

When an aircraft crashes at an airport and in doing so blocks a runway, it is usually imperative that the obstruction be removed as quickly as possible. This frequently means that the aircraft is simply dragged away along the ground, with the result that considerable additional damage may be caused to the wings and fuselage. Moreover because of the high degree of friction between the aircraft and the ground, very powerful towing vehicles are necessary. Alternatively, crashed aircraft are sometimes first raised from the ground and then lowered onto trucks for removal, but this is a relatively slow process.

It is an object of the present invention to provide means for moving a heavy load, and particularly although not exclusively a crashed aircraft, which means is capable of rapid operation wherein, moreover, the likelihood of damage to the load during movement thereof is virtually eliminated.

According to the present invention, means for moving a heavy load comprises a support to be placed under an accessible part of the load, and a track over which the support can be dragged to move the load, the support or the track being an inflatable component made at least partly of flexible material and capable of expansion from an inoperative deflated condition to an operative expanded condition by the admission of pressure fluid thereto.

Preferably, but not necessarily, both the support and the track are inflatable components capable of expansion as aforesaid.

The pressure fluid used to cause expansion of the support and/or track may be a gas (for example, air) or a liquid (for example, water or liquid soap) or a combination of the two; and the pressure fluid may be a liquid, such as a settable resin for example, which will solidify after injection into the inflatable component or components.

The support and the track may both be made from a "composite fabric," by which is meant a known material of the kind comprising at least two superimposed layers of fabric tied together by retaining threads for the purpose of preventing separation of the layers beyond a predetermined amount. When the support and track are both to be inflated by a gaseous pressure fluid, the layers of the composite fabric are selected so as to be gas-impermeable.

However if liquid soap, for example, is to be used as the medium for expanding the support, then the surface of the support that contacts the track as the support is dragged thereover is preferably made of porous material (either inherently porous or rendered so by perforation) so that liquid soap may exude from the expanded support and act to reduce friction during dragging; alternatively, but less desirably, liquid soap can be used to expand the track, in which case the upper surface of the track is preferably made of porous material for the same friction-reducing purpose. Thus when liquid soap is used as the pressure fluid, it can be made to perform the two-fold purpose of expanding the inflatable component or components and reducing friction therebetween.

Alternatively other friction-reducing means may be used. For example the contacting surfaces of the track and support may be formed from, or provided with a layer of, a material having a low coefficient of friction, such as nylon for example. As a still further alternative, casters, balls or rollers (preferably inflatable rollers) may be introduced between the lower surface of the support and the upper surface of the track.

Each of the components (that is the support and track) may be made up of a number of standard elements joined together end to end or one above another to give the necessary length or height as the case may be. Each of such elements, when made expansible, and each of the compartments into which it is preferably divided for safety purposes, is provided with its own valve or valves for controlling admission of pressure fluid and, except in cases where a solidifying fluid is used, withdrawal thereof.

Two embodiments of the present invention will now be described in greater detail and by way of example, with reference to the accompanying diagrammatic drawings, in which.

In the situation diagrammatically represented in FIG. 1, use is made of two parallel tracks 1, each below a different one of the wings of the aircraft. Each track is made up of a number of inflatable elements 1a placed end to end and fixed to the ground by anchoring means at 2. The individual elements 1a are each internally subdivided into compartments and each such compartment has its own valve 3 for controlling the admission of pressure gas and the withdrawal thereof.

Figure 2:
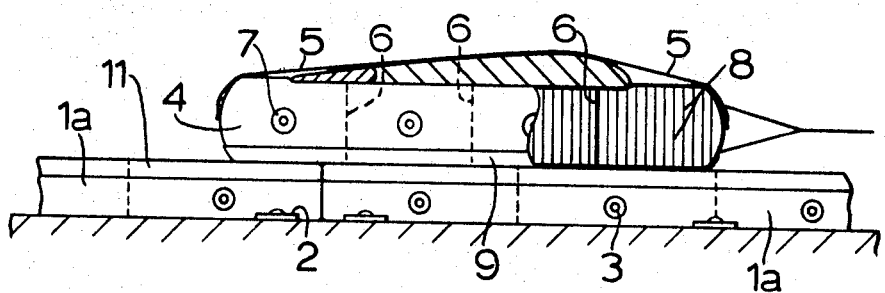
FIG. 2 is a section through the aircraft wing on the line II—II of FIG. 1, showing the underlying support and track of a first embodiment.

Similarly, each inflatable support 4, which is lashed to the appropriate aircraft wing by lines 5, is internally divided into compartments by partitions 6 and each such compartment has its own valve 7 for the admission and subsequent withdrawal of pressure gas. As will be seen best from FIGS. 2 and 3 each support 4 is of general mattress shape when expanded. In FIG. 2 the outer wall of the support 4 is shown broken away at the right-hand end to reveal the internal structure of the support; it will be seen from this FIG. that the support is made of a so-called composite fabric as defined above, the top and bottom fabric layers of the support being tied together by a multiplicity of retaining threads 8. The tracks 1 are of the same internal structure.

In the embodiment shown in FIG. 2, the bottom surface of the support 4 and the upper surface of the track 1 are respectively covered by layers 9 and 11 of nylon. Because of the low coefficient of friction of this material, the support 4 can be dragged over the track 1 with the minimum of friction.

Figure 3:
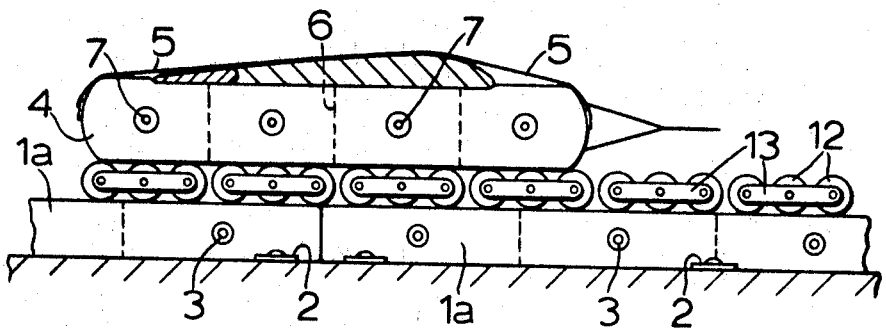
FIG. 3 is a view similar to FIG. 2 but of a second embodiment of the invention.

In the embodiment shown in FIG. 3, however, the layers 9 and 11 are omitted and their purpose is served by the interposition of rollers 12 between the upper surface of the track and the bottom surface of the support 4. The rollers 12 are themselves inflatable and are articulated by links 13.

In operation, whichever of these two embodiments is to be employed, the or each track 1 is laid down in its deflated condition under an accessible part of the aircraft and the associated support 4, also deflated at this stage, is placed on top of the track; if the FIG. 3 embodiment is to be used the rollers 12 (also uninflated) are, of course, placed on the track before the support is positioned. The track and support (and also the rollers 12, where applicable) are then inflated by the admission of pressure gas until they raise the aircraft from the ground, the components thereby jointly acting as a jack. The support can then be dragged over the track, in the direction of the arrows in FIG. 1, bearing the load with it. The pulling force necessary to move the support relatively to its respective track can be provided by any known means, for example a towing vehicle.

Figure 1:
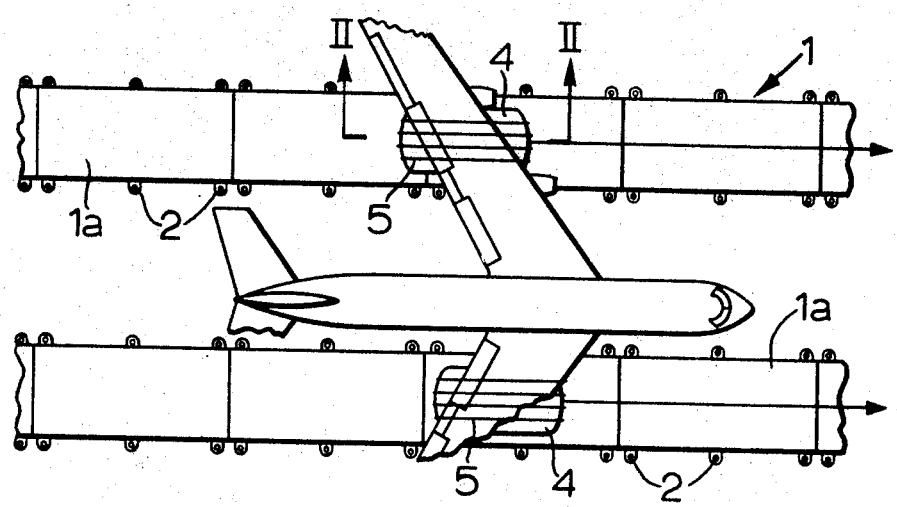
FIG. 1 is a plan view of spaced supports and tracks in accordance with the present invention, in use during the removal of a crashed aircraft.

Although FIG. 1 shows a pair of spaced tracks, each with its own load-bearing support 4, it will be appreciated that a single track and support may be sufficient for some loads; or alternatively that several supports may be employed on a single broad track.

It will be further appreciated that means according to the present invention can be introduced into locations which are inaccessible to conventional load-moving apparatus such as cranes for example. Moreover inflation of the track, as in the preferred embodiments described above, provides an even regular surface over which the load can be moved, however rough and irregular the underlying terrain.

What I claim as my invention and desire to secure by Letters Patent is:

1. Means for moving a heavy load, comprising s support to be placed under an accessible part of the load, a plurality of track elements adapted to be arranged in abutting end-to-end relationship to provide an extended length of track over which the support can be dragged to move the load and the track elements having anchoring means for securing the elements to the ground in said end-to-end relationship, the support and the track elements being inflatable components made at least partly of flexible material and each being separately capable of expansion from an inoperative deflated condition to an operative expanded condition by the admission of pressure fluid thereto, and rollers being interposed between the upper surface of the track and the bottom surface of the support.

2. Means according to claim 1, wherein the interposed rollers are inflatable.

3. Means according to claim 1, wherein the support is internally partitioned into a number of compartments, each such compartment having a separate valve to control the admission of pressure fluid thereto.

4. Means according to claim 1, wherein the track is made up of a plurality of standard elements placed end to end, each such element being internally partitioned into a number of compartments and each compartment having a separate valve to control the admission of pressure fluid thereto.

* * * * *